United States Patent
Rohrauer

(10) Patent No.: US 10,186,901 B2
(45) Date of Patent: Jan. 22, 2019

(54) ELECTRICAL POWER AVAILABILITY INTERFACE

(71) Applicant: Bayerische Motoren Werke Aktiengesellschaft, Munich (DE)

(72) Inventor: Peter Rohrauer, Hoerlkofen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 324 days.

(21) Appl. No.: 14/998,154

(22) Filed: Dec. 23, 2015

(65) Prior Publication Data
US 2016/0141918 A1    May 19, 2016

Related U.S. Application Data

(63) Continuation of application No. PCT/EP2014/063549, filed on Jun. 26, 2014.

(30) Foreign Application Priority Data

Jun. 27, 2013   (DE) .................. 10 2013 212 489

(51) Int. Cl.
*H02J 13/00* (2006.01)
*H02J 3/38* (2006.01)
(Continued)

(52) U.S. Cl.
CPC ....... *H02J 13/0075* (2013.01); *B60L 11/1838* (2013.01); *B60L 11/1844* (2013.01);
(Continued)

(58) Field of Classification Search
CPC . H02J 13/0075; G05B 13/026; B60L 11/1844
See application file for complete search history.

(56) References Cited

U.S. PATENT DOCUMENTS 7,225,087 B1* 5/2007 Siciliano .................. H02J 3/38
702/58
8,531,161 B2* 9/2013 Glauning .............. H02J 7/0047
320/136

(Continued)

FOREIGN PATENT DOCUMENTS

DE         100 39 134 A1    2/2002
DE    20 2007 017 510 U1    4/2008
(Continued)

OTHER PUBLICATIONS

PCT/EP2014/063549, International Search Report dated Oct. 14, 2014 (Three (3) pages).

(Continued)

*Primary Examiner* — Laura Menz
(74) *Attorney, Agent, or Firm* — Crowell & Moring LLP

(57) ABSTRACT

A method for decentralizing a piece of information pertaining to a power availability situation in a power grid at a particular instant includes ascertaining power availability data in the power grid by a power control center that is associated with the power grid, and generating a piece of power availability information by the power control center at the particular instant. The method also includes transmitting the power availability information from the power control center to at least one data reception system, and processing and/or outputting the power availability information by the data reception system.

15 Claims, 1 Drawing Sheet

(51) Int. Cl.
  *B60L 11/18* (2006.01)
  *G05B 13/02* (2006.01)

(52) U.S. Cl.
  CPC .............. *G05B 13/026* (2013.01); *H02J 3/38* (2013.01); *Y02E 60/721* (2013.01); *Y02E 60/7853* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01); *Y04S 40/126* (2013.01)

(56) References Cited

U.S. PATENT DOCUMENTS

| | | | |
|---|---|---|---|
| 9,952,568 B2* | 4/2018 | Livadaras | G06Q 10/00 |
| 2008/0028237 A1* | 1/2008 | Knight | H04L 12/66 |
| | | | 713/300 |
| 2008/0040479 A1* | 2/2008 | Bridge | B60L 3/12 |
| | | | 709/224 |
| 2008/0201587 A1* | 8/2008 | Lee | G06F 1/3203 |
| | | | 713/320 |
| 2010/0134067 A1* | 6/2010 | Baxter | B60L 3/0084 |
| | | | 320/109 |
| 2010/0295383 A1* | 11/2010 | Cummings | H01L 31/02021 |
| | | | 307/151 |
| 2012/0095830 A1* | 4/2012 | Contreras Delpiano | |
| | | | G06Q 30/02 |
| | | | 705/14.49 |
| 2014/0046495 A1* | 2/2014 | Magnussen | H02J 3/14 |
| | | | 700/291 |
| 2014/0236366 A1* | 8/2014 | Livadaras | G06Q 10/00 |
| | | | 700/286 |
| 2014/0319916 A1* | 10/2014 | Cummings | H02J 1/102 |
| | | | 307/53 |
| 2015/0372539 A1* | 12/2015 | Livadaras | G05B 15/02 |
| | | | 700/297 |
| 2016/0141918 A1* | 5/2016 | Rohrauer | H02J 3/38 |
| | | | 700/291 |

FOREIGN PATENT DOCUMENTS

| | | |
|---|---|---|
| DE | 20 2009 000 259 U1 | 4/2009 |
| DE | 10 2008 043 212 A1 | 4/2010 |
| DE | 10 2008 037 575 A1 | 7/2010 |
| DE | 10 2010 001 874 A1 | 8/2011 |
| DE | 10 2012 103 081 A1 | 10/2012 |
| WO | WO 2014207118 A1 * 12/2014 ................ H02J 3/38 |

OTHER PUBLICATIONS

German Search Report issued in counterpart application No. DE 10 2013 212 489.9 dated May 13, 2014, with Statement of Relevancy (Seven (7) pages).

* cited by examiner

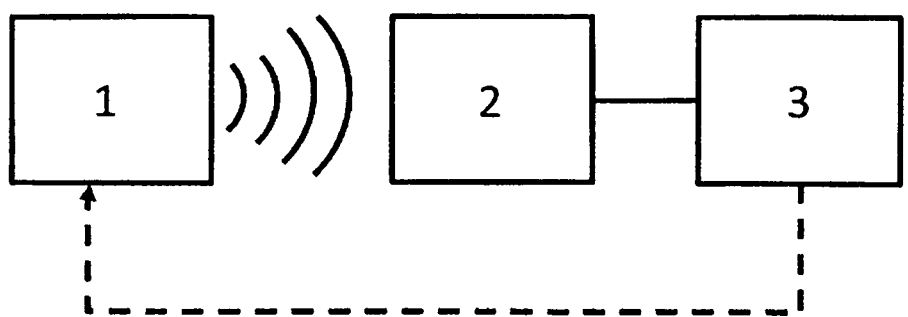

ELECTRICAL POWER AVAILABILITY INTERFACE

CROSS REFERENCE TO RELATED APPLICATIONS

This application is a continuation of PCT International Application No. PCT/EP2014/063549, filed Jun. 26, 2014, which claims priority under 35 U.S.C. § 119 from German Patent Application No. 10 2013 212 489.9, filed Jun. 27, 2013, the entire disclosures of which are herein expressly incorporated by reference.

BACKGROUND AND SUMMARY OF THE INVENTION

The invention relates to a method and an apparatus for decentralizing a piece of information pertaining to a power availability situation in a power grid for a particular instant.

Modern power distribution grids are complex systems. Particularly the use of regenerative power generating technologies means that there is increasingly a decentralized feed to the power grid. The feed situation with the power generators and the demand situation with the energy consumers can combine to lead to a temporary surplus or deficiency of power.

To match the supply situation in the power grid to demand in the best possible manner, the prior art deals with measures for optimized load management. This involves the recording of time profiles for the consumption of electric power in view of the supply of electric power in order to make forecasts for future periods. This is evident from the specification DE 102012103081 A1, for example.

It is an object of the invention to specify an improved method and an improved apparatus for decentralizing a piece of information about a power availability situation in a power grid for a particular instant.

The invention provides a method for decentralizing a piece of information pertaining to a power availability situation in a power grid at a particular instant, having the steps of ascertainment of power availability data in the power grid by a power control center that is associated with the power grid, generation of a piece of power availability information by a power control center at the particular instant, transmission of the power availability information from the power control center to at least one data reception system, and processing and/or output of the power availability information by the data reception system.

The power availability data can be ascertained by an electricity exchange as a power control center, for example, at which data pertaining to the supply and demand situation in the relevant power grid are combined. This power control center can use the situation in the power grid to derive a piece of information that is referred to as power availability information and that indicates a surplus or a deficiency of power or that is a prerequisite for identification of a surplus or of a deficiency. Hence, the power availability information is provided directly or implicitly on the basis of supply and demand in the relevant power grid. If need be, following transmission it is possible for the power availability information to be augmented with further information, e.g. local information from a transmission receiver. This information may be scheduled switch-on times for coupled/connected sources or sinks, capacities of the line as far as the next node, emission/acoustics guidelines for the starting of a unit or legal restrictions, for example. The power availability information thus at least implicitly comprises a piece of information pertaining to a power surplus or a power deficiency at the particular instant.

It is additionally expedient if the method is extended by the steps of ascertainment of a power availability forecast for a prescribed period, following the particular instant, in the power grid by a power control center that is associated with the power grid, generation of a piece of power forecast information by the power control center for the prescribed period, transmission of the power forecast information from the power control center to the at least one data reception system, and processing and/or output of the power forecast information by the data reception system.

This means that the power control center can produce not only the power availability information but also a piece of power forecast information that allows a forecast about the evolution of the availability situation in the power grid for a period following the particular instant. The power forecast information is thus at least a trend in the power availability information according to which the power availability in the relevant power grid rises or falls. The manner of ascertainment of the forecast can be based on various aspects, e.g. on the basis of a probability calculation using empirically ascertained load behavior lines, etc. This is thus a method not just for decentralizing a piece of information about a power availability situation in a power grid at a particular instant but additionally or alternatively also for a forecast period.

Expediently, the method steps are repeated at recurring intervals. Ideally, the repetition takes place at shorter intervals of time than the total duration of the period that is covered by the power forecast information. Alternatively, the signal is ascertained and sent continuously.

According to a further variant of the invention, transmission involves the power availability information and/or the power forecast information being sent as a signal by a transmitter and received by the at least one data reception system as a signal by a receiver that the data reception system comprises.

In addition, it is expedient if transmission involves the power availability information and/or the power forecast information being sent as a radio signal by a radio transmitter and received by the at least one data reception system as a radio signal by a radio receiver that the data reception system comprises.

By way of example, a long-wave transmitter that is associated with the power control center and a long-wave receiver of the data reception system are suitable for this purpose. Alternatively, it is possible to use, by way of example, mobile radio signals, locating signals, broadcast radio signals in the inaudible range, TV or cable network signals and optical signals or signals that are superimposed in the power grid on the basis of the principle of carrier frequency transmission by means of carrier frequency systems.

It is possible for the power availability information to be transmitted independently of the power forecast information being transmitted. This is particularly advantageous when the power grid contains time-delayed sources and/or sinks and time-controlled loads or small power stations with a start-up phase.

Expediently, the output element on the data reception system that comprises the receiver and an output element can output at least two states and reproduces the received power availability information in the form of a first state of the output element for a power surplus and in the form of a second state of the output element for a power deficiency.

Alternatively or additionally, the output element is used for transmitting the information to a system that can be connected and/or can be coupled to the output element, for example in the form of an output element, processing element or control element. By way of example, the coupling can be made by cable, radio or infrared for the purpose of a data link. The connectable system may also essentially be of digital design, e.g. as an external cloud functionality or software. The transmission can similarly take place to a plurality of such elements.

This means that the data reception system indicates a surplus or a shortage of power in the relevant power grid at the relevant instant, for example using a two-color display.

Alternatively or additionally, the data reception system may be in a form such that it indicates a surplus or a shortage of power in the relevant power grid in the imminent period on the basis of the power forecast information and using a two-color display.

By way of example, a long-wave transmitter that is associated with the power control center and a long-wave receiver of the data reception system are suitable for this purpose. Alternatively, it is possible to use, by way of example, mobile radio signals, locating signals, broadcast radio signals in the inaudible range, TV or cable network signals or signals that are superimposed in the power grid on the basis of the principle of carrier frequency transmission.

It is expedient if the data reception system that comprises the receiver and, by way of example, two output elements can output at least two states, e.g. a first output element can output at least two states, the first output element reproduces the received power availability information in the form of a first state of the first output element for a power surplus and in the form of a second state of the first output element for a power deficiency, a second output element can output at least two states, and the second output element reproduces the received power forecast information in the form of a first state of the second output element for a power surplus forecast and in the form of a second state of the second output element for a power deficiency forecast.

This means that the data reception system indicates a surplus or a shortage of power in the relevant power grid at the relevant instant, for example using a first two-color display, and indicates a positive evolution or a negative evolution in the power availability in the relevant power grid for the period following the relevant instant using a second two-color display.

The connectable and/or couplable system can receive the information transmitted by the control center to the data reception system and if need be can read it in and process it further. The further processing can, in particular, take place locally on the data reception system or on the connectable and/or couplable system and comprise scheduled switch-on times for coupled/connected sources or sinks, capacities of the line as far as the next node, emission/acoustics guidelines for the starting of a unit or legal constraints, for example.

It is particularly advantageous if the data reception system is embodied as a mobile terminal or is functionally integrated in a mobile terminal.

By way of example, the data reception system may preferably be embodied as a standalone device with the radio receiver. Said device can be referred to as a power pager and, by way of example, carried by a person so as at all times to provide him with information about the situation in the power grid locally and over time during or before a power-consuming or power-generating activity (e.g. charging an electric vehicle, switching on a laundry dryer, starting a biomass power station, etc.) and to allow his own behavior to be matched to the availability situation in the power grid. Alternatively, integration in hardware, for example in power outlets, power consumption meters and/or functional integration in software such as in a smartphone application (app) are also possible. The matching of behavior promotes ecological action by the user and means that the power grids are easier to control and regulate. Load peaks, surpluses and safety reserves in the power grid in question can therefore be reduced. This helps to save resources and reduce energy costs.

Furthermore, the data reception system may be included in a hybrid or electric vehicle or in a charging means (e.g. a charging station) for externally charging a hybrid or electric vehicle, for example.

The user of the vehicle can therefore make a charging process dependent on the information on the data reception system. It may also be useful to support the power grid by means of the energy storage or energy generation integrated in the vehicle.

According to a further variant, the data reception system may be included in a power storage unit or in a power generating unit.

By way of example, these may be electrical stores, diesel units, photovoltaic installations or else power station installations such as backwater stages.

The invention is based on the considerations that are set out below:

Power distribution grids today are reaching their limits. Particularly feed volumes from renewable energy generating sources are difficult to plan, which is why temporary oversupplies or undersupplies can arise. In addition, the rising number of energy sources/sinks intensifies this effect. There is a control option at grid supplier level, but not at the level of consumers or small producers.

The situation today has the disadvantage that locally the grid situation is not transparent. As a result, loads are activated at instants at which the grid currently has insufficient coverage, or power is supplied at instants at which the grid has an oversupply.

To improve the provision of up-to-date information pertaining to the grid condition (such as supply, demand, trend, forecast, etc.), said information can be distributed by radio, cable, Internet or the power grid itself, for example. Simple terminals or software functions can indicate the grid condition, provide a recommendation or else actively control consumption or supply. This relates to a multiplicity of electrical devices, e.g. from the household, from the building supply, from industry or hybrid or electric vehicles that are on the power grid.

Consumers and producers in power grids are provided with feedback about the grid condition and can take proactive action. This results in sensitization and avoidance of peak loads in the power grid and in better coverage of the basic load. This facilitates the central control and regulation of the grid condition.

Simple terminals, e.g. a power pager, with a similar manner of operation to radio clocks, can achieve a high level of market penetration and/or be used as giveaways.

A preferred exemplary embodiment of the invention is described below with reference to the accompanying drawings. This will provide further details, preferred embodiments and developments of the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 schematically shows a method for transmitting a piece of power availability information and/or a piece of power forecast information.

DETAILED DESCRIPTION OF THE DRAWINGS

A power control center (1) for a particular power grid, e.g. an electricity exchange or a supply syndicate, uses the information on which trade is based to ascertain a supply and consumption situation for the power grid in question. These data are used to derive a piece of power availability information that is needed in order to identify the presence of a power surplus or a shortage situation in the grid. In this respect, the information preferably contains two states. The power availability information is updated by the power control center continuously or at regular intervals. Specific algorithms for ascertaining the availability situation in the power grid are not the subject of this work.

The power control center may be formed by a plurality of subunits and/or ancillary units. These may be of organizational, legal, technical or functional type and also distributed in space and/or time, for example.

The up-to-date power availability information is transmitted by radio, for example, in this case by a long-wave transmitter of the power control center to a data reception system (2) that comprises a receiver for long waves, without a time delay after it is ascertained.

The data reception system displays to a user (3) of the data reception system the two-stage information about the power availability in the power grid that the long-wave signal contains, for example. For this purpose, the data reception system can have an LED display that, according to the present exemplary embodiment, lights up in the event of a surplus of power and is deactivated in the event of a shortage of power.

According to an alternative embodiment, besides the power availability information and/or the power forecast information following reception by the data reception system, further, e.g. locally available information (for example as a result of scheduled switch-on times for coupled/connected sources or sinks, as a result of capacities of the line as far as the next node, as a result of emission/acoustics guidelines for the starting of a unit or as a result of legal constraints) is processed in order to ascertain the presence of a power surplus or a shortage situation in the grid at the point of data reception.

According to one embodiment, the state of the display can be automatically adjusted when a piece of updated power availability information is received. This allows the availability situation in the power grid to be displayed to the user locally by a simple and robust technical system, which can also be referred to as a power pager or power availability interface.

On the basis of the received information, the user of the data reception system, who is also the user of the relevant power grid to which the power availability information and/or power forecast information relates, can regulate his use and/or supply behavior. This means, by way of example, that if the supply situation is poor then he interrupts a charging process for an electric vehicle or, by way of example, defers activation of a washing machine, or if the supply situation is good, i.e. the lamp is activated, then he activates the washing machine. If the supply situation is poor, he can also control small power stations (internal combustion engines, biomass, hydroelectric power, etc.) or stores (water, storage batteries, etc.) to actively supply the grid.

Hence, the individual user reacts to the availability situation in the power grid by means of his user and/or supply behavior and thus influences the evolution of the subsequent piece of power availability information. This is indicated by the dashed arrow in FIG. 1.

If a multiplicity of consumers or power generators use a power pager or a power availability interface in the manner shown in FIG. 1, a more uniform load profile is produced in the power grid.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for decentralizing information pertaining to a power availability situation in a power grid, the method comprising:
   providing a user device comprising: a receiver and a light emitting diode, the user device being located remote from a power control center associated with a power grid;
   transmitting to the user device, via a transmitter at the power control center, power availability information generated by the power control center, the power availability information reflecting which of the following states is occurring within the power grid: a surplus or a shortage of available power;
   activating the light emitting diode when power availability information is received by the receiver reflecting the surplus of power in the power grid;
   powering a power sink via the power grid in response to the activation of the light emitting diode and not powering the power sink via the power grid in response to an inactivation of the light emitting diode.

2. The method as claimed in claim 1, further comprising:
   transmitting to the user device power availability forecast information generated by the power control center, the power availability information reflecting which of the following states is to occur within the power grid for a prescribed period: the surplus or the shortage of available power; and
   activating the light emitting diode when power availability forecast information is received by the wireless receiver reflecting the surplus of power in the power grid for the prescribed period.

3. The method of claim 1, further comprising repeating the acts of claim 1 in one of a continuous or regular manner.

4. The method of claim 1, wherein the transmitter is a radio transmitter, and the receiver is a radio receiver.

5. The method of claim 2, wherein the transmitter is a radio transmitter, and the receiver is a radio receiver.

6. The method of claim 2, wherein the light emitting diode is activated for the prescribed period.

7. The method of claim 1, wherein the user device further comprises: an additional light emitting diode, and comprising the further act of:
   transmitting to the user device power availability forecast information generated by the power control center, the power availability information reflecting which of the following states is to occur within the power grid for a prescribed period: the surplus or the shortage of available power; and activating the additional light emitting diode when power availability forecast information is received by the wireless receiver reflecting the surplus of power in the power grid for the prescribed period.

8. The method of claim 1, comprising the further act of:
transmitting the power availability information from the user device to a system configured to perform at least one of an output, a processing, a control and regulation operation with respect to power sinks and power sources coupled to the power grid.

9. The method of claim 2, comprising the further act of:
transmitting at least one of the power availability information and the power forecast information from the user device to a system configured to be one of connected and coupled to the output element, and at least one of the power availability information and power forecast information is used by the system to perform at least one of an output, a processing, a control and regulation operation with respect to power sinks and power sources coupled to the power grid.

10. The method of claim 1, wherein the user device is a mobile terminal.

11. The method of claim 2, wherein the user device is a mobile terminal.

12. The method of claim 1, wherein the user device is comprised in one of: a hybrid and an electric vehicle.

13. The method of claim 2, wherein the user device is comprised in one of: a hybrid and an electric vehicle.

14. The method of claim 1, wherein the user device is comprised in one of: a power storage unit and a power generating unit.

15. The method of claim 2, wherein the user device is comprised in one of: a power storage unit and a power generating unit.

* * * * *